Patented July 9, 1935

2,007,869

UNITED STATES PATENT OFFICE 2,007,869

SULPHURIC ACID DERIVATIVES OF ETHER-ESTERS AND THEIR PRODUCTION

Wolfgang Lübbert, Dusseldorf, Germany, assignor to firm Henkel & Cie., Gesellschaft mit beschrankter Haftung, Dusseldorf, Germany No Drawing. Application November 29, 1932, Serial No. 644,910. In Germany December 5, 1931

12 Claims. (Cl. 260—103)

It has been found that a new class of valuable saponaceous products may be obtained if reactive hydroxy- or mercapto-fatty acid esters, which are alkylated, arylated, cycloalkylated or aralkylated at the oxygen or sulphur, or their derivatives or substitution products are treated with sulphonating agents.

According to the nature of the substituents true sulphonic acids or sulphuric acid esters are thereby formed. The sulphuric acid radical may enter either into the ester group or into the ethereally combined group of the starting substance or into both.

The sulphonation may be carried out with strong sulphuric acid, sulphuric acid containing $SO_3$, $SO_3$ or its addition products with organic compounds, chlor-sulphonic acid or the like, and the operation may be carried out in the presence of solvents, diluents or dehydrating agents.

In order to carry out the process, the esters of unsaturated mercapto-fatty acids and saturated hydroxy- or mercapto-fatty acids with a long or short carbon chain may be employed. Furthermore, it is also possible to employ esters of unsaturated hydroxy-fatty acids with a short carbon chain, which are alkylated, arylated, cycloalkylated or aralkylated at the oxygen or sulphur. Finally, it is also possible to employ esters of unsaturated hydroxy-fatty acids with a long carbon chain which are substituted at the oxygen by other radicals than alkyl or phenyl radicals. The said compounds may be obtained according to the process disclosed in U. S. patent application of myself and Ernst Ludwig Müller, Serial No. 644,911, filed of even date herewith.

Such organic compounds may be obtained if hydroxy- or mercapto-fatty acids which are alkylated, cycloalkylated, aralkylated or arylated at the oxygen or sulphur or their derivatives or substitution products, are esterified with aliphatic or hydroaromatic compounds which contain at least one hydroxyl or mercapto group, and at least 6 carbon atoms.

In place of the said fatty acid derivatives, their substitution products may also be employed. As such come into consideration for example, radicles of the type specified substituted by halogen groups, hydroxy groups, sulphonic acid groups, carboxyl groups, hydrocarbon radicals or basic radicals and the like.

As fatty acid radicals, the known fatty acids with normal or branched chain may be employed.

As aliphatic or hydroaromatic compounds containing hydroxy groups, alcohols having straight or branched carbon chains may be employed, such as, for example, the products formed by the hydrogenation of fatty acids, naphthenic acids, resin acids, the oxidation of paraffins, the decomposition of wax-like substances, the hydrogenation of phenols and the like. Also polyvalent alcohols or mercaptans may also be employed with the same success for the synthesis of compounds of the class referred to above.

The compounds containing hydroxyl groups or mercapto groups may be of a saturated or unsaturated nature.

The said compounds, which contain hydroxyl or mercapto groups, may in their turn contain substituents of all kinds, such as carboxyl groups or their derivatives, halogens, ether groups, sulphonic acid groups and the like.

The esterification of the components is effected in known manner with the free acids, if desired in the presence of catalysts. Derivatives of the fatty acids obtained by modifying the carboxy-group, such as chlorides, anhydrides, salts may be employed, or the principle of alcoholysis may be applied.

Also instead of the hydroxy compounds, their reactive derivatives, such as mineral acid esters, or ester salts or alcoholates may be employed.

Examples (1) 1200 parts by weight of concentrated sulphuric acid are cooled to about 0° C. 320 parts by weight of molten or coarsely powdered phenoxyacetic acid-dodecylester are allowed to trickle in while stirring, care being taken that the temperature does not substantially exceed 30° C. As soon as, after long continued stirring, a sample is soluble in cold water with a clear solution, the homogeneous, slightly brown, syrupy reaction mixture is placed upon ice.

The new sulphonic acid may be isolated by the usual processes, for example, salting out with Glauber's salt. Its sodium salt, in the pure state, constitutes a white mass which is readily soluble in water. The solutions have a high foam-producing power.

(2) Into 1000 parts by weight of concentrated sulphuric acid are introduced at 20–25° C. with stirring, 230 parts by weight of coarsely powdered phenoxyacetic acid octodecylester, and are left to the action of the sulphuric acid until a sample withdrawn is soluble in the water with a clear solution. The somewhat viscous mass is worked up as in Example 1.

Similarly, the esters of phenoxyacetic acid and hexadecanol, tetradecanol, octanol, and mixtures of these alcohols may be sulphonated with 2½ to 3 times the quantity of concentrated sulphuric acid, and these sulphonation products, after being worked up as in Example 1 and after neutralization with sodium carbonate are obtained in the form of beautiful white powders. The aqueous solutions of the salts of the sulphonation products have a high foam-producing power.

(3) 75 grams of phenoxyacetic acid-oleylester are dissolved in the same quantity of absolute ether and cooled to 0° C. 60 grams of chlorsulphonic acid, diluted with 50 cc. of absolute ether are allowed to run in slowly while stirring. To complete the reaction, stirring is continued for a further 3 hours at 15–20° C. The mixture is introduced into ice water, and is neutralized with sodium carbonate and the ether is evaporated. After distilling off the water in a vacuum almost to dryness and after cooling, the sodium salt of the sulphonation product is obtained in the form of a somewhat firm paste.

(4) 200 grams of an ester mixture obtained from paraffin alcohols (acetyl number: 212) and phenoxyacetic acid is gradually added at 10–20° C. with stirring to three times the quantity by weight of concentrated sulphuric acid. To complete the reaction, stirring is then continued for a further two hours. The treatment is carried out as in Example 1. The sodium salts of the sulphonic acids produced are obtained in the form of a white powder.

(5) 30 parts by weight of the ethoxyacetic acidoleyl ester obtained from commercially pure oleyl alcohol (iodine number 93) are dissolved in 50 parts by weight of ether. 45 parts by weight of concentrated sulphuric acid are allowed to trickle into the mixture at 5° to 7° C. with vigorous stirring. After completion of the sulphonation, the mixture is placed on ice, the clear aqueous solution is carefully neutralized with soda and is worked up as usual. The new compound dissolves in water with exceptional ease, with the formation of solutions having a strong foam-producing power.

(6) 100 parts of the mono-oleyl alcohol ester of thiodiglycollic acid are mixed with 250 parts of concentrated sulphuric acid while being cooled with ice. After slow heating to room temperature, the mixture is stirred for some hours. The reaction mixture is then placed in ice water, whereupon it sets to a viscous mass. The latter is washed repeatedly with water, and is exactly neutralized with soda solution. After boiling for a short time, the solution is evaporated to dryness. The sodium salt of the sulphonation product of the mono-oleyl ester of thiodiglycollic acid is thus obtained in the form of a viscous mass giving with water an almost clear solution having a good foam-producing power.

(7) 141 parts of (hydroxy-ethoxy)-acetic acid dodecyl ester are dissolved in absolute ether and are mixed with 61 parts of chlorsulphonic acid, diluted with absolute ether, at 0° to 5° C. while being well stirred. After about one hour's stirring at 10° to 15° C., the sulphonation is complete. The ethereal solution is carefully neutralized with bicarbonate, and after evaporation of the ether, the product is re-crystallized from alcohol, being obtained in the form of shining, white crystals. In addition to its ready solubility in water, it exhibits a very pronounced foam-producing power.

The same properties are also exhibited by the sulphonation product of the (β-γ-dihydroxypropyl-hydroxy)-acetic acid-dodecyl-ester.

(8) 120 parts of (hydroxy-ethoxy)-acetic acid octyl-ester are dissolved in absolute ether and are sulphonated at −5° C. for two hours with 62 parts of chlorsulphonic acid dissolved in absolute ether. The ethereal solution is then neutralized with sodium carbonate while being well cooled, and the product is worked up in the usual way. The aqueous solutions exhibit a very good foam-producing power.

(9) 139 parts of (hydroxy-ethoxy)-acetic acid-octodecyl ester, sulphonated in 800 parts of absolute ether, with 62 parts of chlorsulphonic acid at −5° to 0° C. likewise yield, after working up, a beautiful crystalline product which is well soluble in water.

(10) 174 parts of an ester mixture formed of (hydroxy-ethoxy)-acetic acid and the alcohols corresponding to the coconut oil fatty acids are sulphonated in 260 parts of absolute ether with 74 parts of chlorsulphonic acid in 100 parts of absolute ether at 0° to 5° C. and are worked up in the known manner. The sodium salt of the sulphuric acid ester mixture exhibits an excellent foam-producing effect together with a very good stability to lime.

I claim:—

1. A process for the manufacture of sulphuric acid derivatives of organic compounds, characterized in that fatty acid esters, which in the fatty acid radical are combined by means of a divalent non-metallic element of the group consisting of oxygen and sulphur with a hydrocarbon radical, are reacted with sulphonating agents.

2. A process for the manufacture of sulphuric acid derivatives of organic compounds, characterized in that fatty acid esters, which in the fatty acid radical are combined by means of a sulphur atom with a hydrocarbon radical, are reacted with sulphonating agents.

3. A process for the manufacture of sulphuric acid derivatives of organic compounds, characterized in that fatty acid esters, which in the fatty acid radical are combined by means of an oxygen atom with a hydrocarbon radical, are reacted with sulphonating agents.

4. A process for the manufacture of sulphuric acid derivatives of organic compounds, characterized in that fatty acid esters, which in the fatty acid radical are combined by means of a divalent non-metallic element of the group consisting of oxygen and sulphur with an alkyl group, are reacted with sulphonating agents.

5. A process for the manufacture of sulphuric acid derivatives of organic compounds, characterized in that fatty acid esters, which in the fatty acid radical are combined by means of a divalent non-metallic element of the group consisting of oxygen and sulphur with an aryl group, are reacted with sulphonating agents.

6. A process for the manufacture of sulphuric acid derivatives of organic compounds, characterized in that mercapto fatty acid esters, which are arylated at the sulphur, are reacted with sulphonating agents.

7. A process for the manufacture of sulphuric acid derivatives of organic compounds, characterized in that hydroxy fatty acid esters, which are alkylated at the oxygen, are reacted with sulphonating agents.

8. A process for the manufacture of sulphuric acid derivatives of organic compounds, characterized in that hydroxy fatty acid esters, which are arylated at the oxygen, are reacted with sulphonating agents.

9. The process which comprises sulphonating an ester of phenoxyacetic acid and a higher fatty alcohol of a molecular weight between about 158 and about 270.

10. The process which comprises sulphonating dodecyl phenoxyacetate.

11. As a compound, the sulphonation product of an ester of phenoxyacetic acid and a higher aliphatic alcohol of a molecular weight between about 158 and about 270, being in the solid state a white powder and soluble in water.

12. As a compound, sulphonated dodecyl phenoxyacetate.

WOLFGANG LÜBBERT.